(12) United States Patent
Brudermann et al.

(10) Patent No.: US 11,150,106 B2
(45) Date of Patent: Oct. 19, 2021

(54) MEASURING DEVICE OF MEASURING- AND AUTOMATION TECHNOLOGY

(71) Applicant: Endress + Hauser Flowtec AG, Reinach (CH)

(72) Inventors: Matthias Brudermann, Moehlin (CH); Nikolai Fink, Aesch (CH); Christoph Schweizer, Laufen (CH); Michael Kirst, Lorrach (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 630 days.

(21) Appl. No.: 16/063,771

(22) PCT Filed: Nov. 16, 2016

(86) PCT No.: PCT/EP2016/077800
§ 371 (c)(1),
(2) Date: Jun. 19, 2018

(87) PCT Pub. No.: WO2017/108274
PCT Pub. Date: Jun. 29, 2017

(65) Prior Publication Data
US 2020/0271475 A1    Aug. 27, 2020

(30) Foreign Application Priority Data
Dec. 21, 2015 (DE) ............ 10 2015 122 442.9

(51) Int. Cl.
*G01D 3/08* (2006.01)
*H04B 10/80* (2013.01)

(52) U.S. Cl.
CPC ............ *G01D 3/08* (2013.01); *H04B 10/80* (2013.01)

(58) Field of Classification Search
CPC ..................................... G01D 3/08
USPC ..................................... 73/865.8
See application file for complete search history.

(56) References Cited

U.S. PATENT DOCUMENTS

| 6,054,938 | A | * | 4/2000 | Nakajima | G01D 5/34723 250/231.13 |
| 2003/0113061 | A1 | * | 6/2003 | Cousineau | G01D 5/34723 385/25 |
| 2003/0129944 | A1 | | 7/2003 | Chang et al. | |
| 2006/0203228 | A1 | | 9/2006 | Niki | |

FOREIGN PATENT DOCUMENTS

| DE |    34 12 108 A1 | 10/1984 |
| DE | 11 2004 001 453 T5 | 7/2006 |
| DE | 10 2008 034 078 A1 | 1/2010 |

(Continued)

OTHER PUBLICATIONS

Kobold. Machine Translation of DE102013114665A1. Published Jun. 2015. Translated Jan. 2021. (Year: 2015).*

(Continued)

*Primary Examiner* — Walter L Lindsay, Jr.
*Assistant Examiner* — Philipmarcus T Fadul
(74) *Attorney, Agent, or Firm* — Bacon & Thomas, PLLC

(57) ABSTRACT

A measuring device comprising at least two output units for output of measured values, wherein the output units are optically coupled. The optical coupling effects a lessening of the manufacturing effort as well as a galvanic isolation of the output units.

13 Claims, 4 Drawing Sheets

(56) References Cited

FOREIGN PATENT DOCUMENTS

| | | |
|---|---|---|
| DE | 10 2012 104 258 A1 | 11/2013 |
| DE | 10 2013 114 665 A1 | 6/2015 |
| DE | 10 2014 019 637 A1 | 12/2015 |
| DE | 10 2015 122 442 A1 | 6/2017 |

OTHER PUBLICATIONS

German Search Report, German PTO, Munich, dated Dec. 15, 2017.
German Search Report, German PTO, Munich, dated Nov. 4, 2016.
International Search Report, EPO, The Netherlands, dated Feb. 28, 2017.

* cited by examiner

MEASURING DEVICE OF MEASURING- AND AUTOMATION TECHNOLOGY

TECHNICAL FIELD

The invention relates to a measuring device of measuring- and automation technology, which measuring device has at least two output units for outputting measured values.

BACKGROUND DISCUSSION

Measuring devices having at least two output units for outputting measured values are applied for various purposes. One reason for application of measuring devices with two output units is that such provides the opportunity for reviewing the functioning of a first output unit, in order to detect a measuring device failure. A further reason for application of such measuring devices can be the desire to change, in a certain manner, the measured value output on an output of a second output unit relative to the measured value output on an output of a first output unit. This can be utilized for making the hacking of the measured value output difficult. This feature can be advantageous in the field of filling and bottling plants. Measuring devices with two output units bring increased requirements for control, since the individual output units must work essentially synchronously, in order to enable the desired functioning. Synchronous operation of the individual output units can be achieved, for example, in that an operating circuit correspondingly controls the individual output units. That increases, however, the requirements for communication between the operating circuit and the individual output units. It is simple to provide communication between the output units. The state of the art discloses, for example, in allowed German patent application, DE102012104258A1, measuring devices with two or more output units, which are wired together. Disadvantageous in such case is the space requirement for lines, cable links, plug connections and the like. In the case of cable links, there is the additional disadvantage that they can only be installed after the output units are located at their intended positions. The manufacturing effort is, thus, increased and the manufacturing, thus, made more expensive.

SUMMARY OF THE INVENTION

An object of the present invention is, consequently, to provide a simple and robust measuring device having at least two mutually communicating, modular output units, which measuring device includes the function of checking a first output unit as well as the function of synchronous control of the outputs of the two output units, wherein an increased wiring effort as well as an increased manufacturing effort are prevented. The object of the invention is achieved by a measuring device as well as by methods.

The measuring device of the invention comprises: a measuring transducer for registering a physical or chemical, measured variable and for generating at least one measured value corresponding to the measured variable; an electronic operating circuit electrically coupled with the measuring transducer and having at least a first communication interface, wherein the operating circuit is adapted to produce, correlating with the measured value, at least a first electrical signal, which is transmitted via the first communication interface; and at least a first output unit having at least a second communication interface and at least one electrical output and at least one optical output, wherein the first output unit is adapted to receive the first signal via the second communication interface and to convert such into a fourth, electrical signal and into a second, optical signal, wherein the fourth signal is output via the electrical output and the second signal via the optical output; and at least a second output unit having at least one optical input and an electrical output; characterized in that the optical input of the second output unit is coupled to the optical output of the first output unit, wherein the second output unit is adapted to receive the second signal via the optical input and to convert such into a fifth, electrical signal.

In an advantageous embodiment, the first output unit derives the second, optical signal from the fourth signal.

In an advantageous embodiment, the operating circuit enables a choice between deriving the second signal from the first signal and the second signal from the fourth signal. In this way, there results the opportunity to detect whether the signal transformation of the first signal into the fourth signal is malfunctioning. In the case of essential differences between the second signal derived from the first signal and the second signal derived from the fourth signal, it can be concluded that a malfunction of the signal transformation is present.

In an advantageous embodiment, the second output unit has a third communication interface to the operating circuit.

In an advantageous embodiment, at least one parameter of the fifth signal has compared with the fourth signal a characteristic change, wherein the at least one parameter is selected from: phase relationship with reference to the fourth signal, frequency, amplitude, output point in time with reference to the fourth signal, wherein the characteristic change is determinable by means of the operating circuit.

In an advantageous embodiment, the at least two output units are galvanically isolated. Galvanic isolation suppresses a mutual influencing of electronic systems, which are connected to the outputs of the output units. Thus, different ground potentials of connected electronic systems in the case of missing galvanic isolation leads to undesired electrical current flows through the output units, which can damage electronic components.

In an advantageous embodiment, the first output unit and the second output unit are of equal construction. In this way, manufacturing and maintenance of a measuring device can be meaningfully simplified and costs lessened.

In an advantageous embodiment, the operating circuit is adapted to transmit the first signal also to the second output unit, wherein the second output unit is adapted to compare the first signal sent by the operating circuit with the second signal obtained from the first output unit and, after comparing the signals, to transmit a third signal to the operating circuit via the third communication interface, wherein the third signal contains information concerning the result of the comparison.

In an advantageous embodiment, the second output unit is adapted to convert the received second, optical signal into an electrical signal and to transmit such via the third communication interface to the operating circuit, wherein the operating circuit performs a comparison of the signal sent to the first output unit with the signal obtained from the second output unit.

In an advantageous embodiment, the first and/or the second output unit are/is adapted in the case of a minimum deviation of at least one signal parameter of the compared signals to produce a warning signal on the associated electrical signal output. The comparing of the signals is based, for example, on measuring of the amplitudes and thereafter analyzing the signal-to-noise ratio. Also an offset of signal edges or the signal amplitudes can be taken into consideration for comparison.

A method of the invention for operating the measuring device includes, in such case, steps as follows: registering a physical or chemical, measured variable; selecting the first output unit by the operating circuit and sending the first signal to the first output unit;
receiving the first signal by the first output unit and converting the first signal into the fourth signal and second signal and outputting the fourth signal on the electrical signal output and outputting the second signal on the optical signal output; receiving the second signal by the second output unit and converting such into the fifth signal.

A method of the invention for operating the measuring device includes, in such case, steps as follows: registering a physical or chemical, measured variable; selecting the first output unit by the operating circuit and sending the first signal to the first output unit; receiving the first signal by the first output unit and converting the first signal into the fourth signal and second signal and outputting the fourth signal on the electrical signal output and outputting the second signal on the optical signal output; receiving the first signal and the second signal by the second output unit and converting the second signal into the fifth signal; comparing the first signal with the second signal by the second output unit and sending the result of the comparison to the operating circuit by means of a third signal. triggering the output of a warning signal by the first and/or the second output unit on their electrical signal outputs by the operating circuit in the case of a minimum deviation of at least one signal parameter of the compared signals.

A method of the invention for operating the measuring device includes, in such case, steps as follows: registering a physical or chemical, measured variable; selecting the first output unit by the operating circuit and sending the first signal to the first output unit; receiving the first signal by the first output unit and converting the first signal into the fourth signal and second signal and outputting the fourth signal on the electrical signal output and outputting the second signal on the optical signal output; receiving the second signal by the second output unit and converting such into the fifth signal and converting the second signal into an electrical signal and sending the electrical signal to the operating circuit; comparing by the operating circuit of the first signal on the first output unit with the second signal received from the second output unit. triggering the output of a warning signal by the first and/or the second output unit on their electrical signal outputs by the operating circuit in the case of a minimum deviation of at least one signal parameter of the compared signals.

In an advantageous embodiment of the method, at least one characteristic change is impressed on the fifth signal, wherein the characteristic change can be, for example, a phase relationship with reference to the fourth signal, frequency, amplitude or output point in time with reference to the fourth signal.

In an advantageous embodiment of the method, after selecting the first output unit, the operating circuit chooses between deriving the second signal from the first signal and the second signal from the fourth signal.

The present invention thus provides a simple and robust measuring device having two output units, wherein the manufacturing effort is reduced and the output units are galvanically isolated.

BRIEF DESCRIPTION OF THE DRAWINGS

The invention will now be explained in greater detail based on examples of embodiments illustrated in the drawing, the figures of which show as follows.

DETAILED DISCUSSION IN CONJUNCTION WITH THE DRAWINGS

Figure 1:
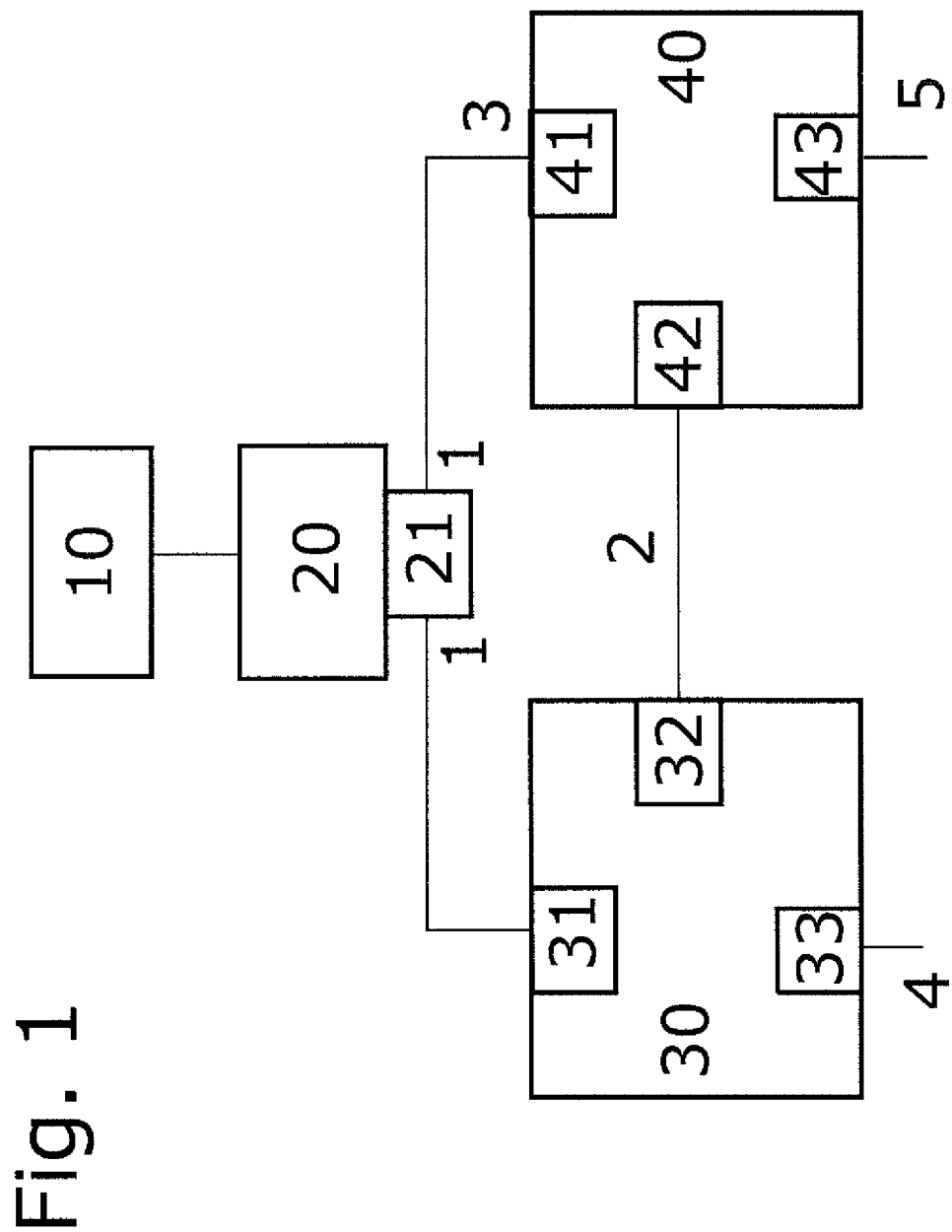
FIG. 1 is a schematic structure of a measuring device of the invention.

FIG. 1 shows the schematic structure of a measuring device of the invention. The measuring device shown here comprises: a measuring transducer 10; an operating circuit 20 with a first communication interface 21; a first output unit 30 with a second communication interface 31, an optical output 32 and an electrical output 33; and a second output unit 40 with a third communication interface 41, an optical input 42 and an electrical output 43. The measuring transducer is adapted to register a physical or chemical, measured variable and to produce at least one measured value corresponding to the measured variable and to transmit the measured value to the operating circuit. The operating circuit is adapted to produce at least a first electrical signal 1 correlating with the measured value and to transmit the electrical signal via the first communication interface 21 at least to the first output unit 30. The first output unit 30 is adapted to receive the first signal 1 via the second communication interface 31 and to convert the first signal into a second signal and a fourth signal, wherein the second signal is transmitted via the optical output 32 to the second output unit 40 and wherein the fourth signal is output on the electrical output 33.

The second output unit 40 is adapted to receive the second signal 2 via the optical input 42 and to convert the second signal into a fifth signal 5 and to output the fifth signal on the electrical output 43. In an advantageous embodiment, the second output unit 40 includes a third communication interface 41, via which the second output unit 40 can communicate with the operating circuit.

Figure 2:
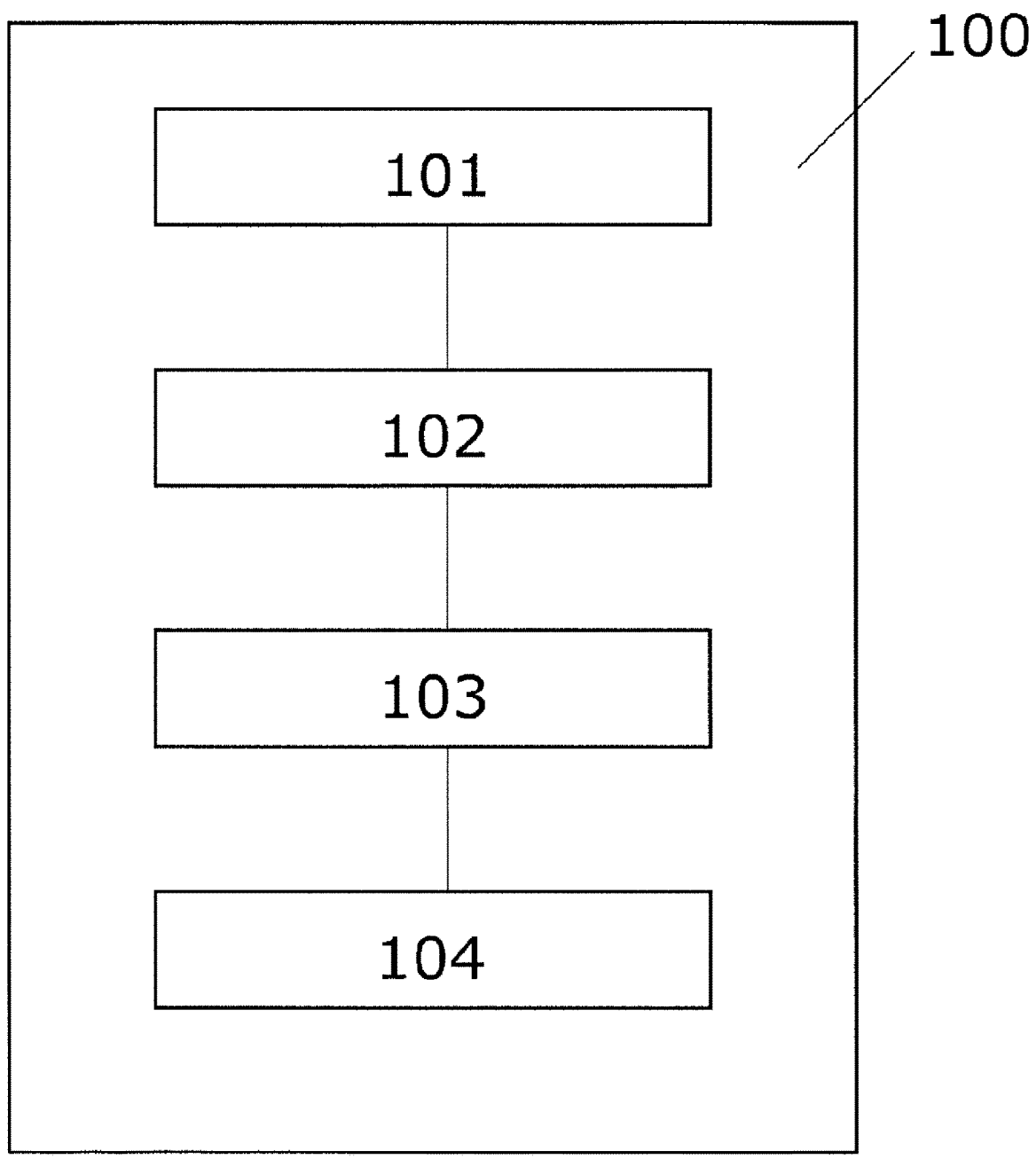
FIG. 2 is by way of example, a flow diagram of a method for operating a measuring device.

FIG. 2 shows a schematic flow diagram of a method 100 of the invention. In a first step 101, the measuring transducer 10 registers a physical or chemical, measured variable and transmits the measured variable to the electronic operating circuit. In a second step 102, the operating circuit 20 selects a first output unit 30 and sends a first signal 1 to the first output unit 30. In a third step 103, the first output unit receives the first signal and converts it into the fourth signal 4 and into the second signal 2 and outputs the fourth signal 4 on the electrical signal output 33 and the second signal on the optical signal output 34. In a fourth step 104, the second signal 2 is received by the second output unit 40 via the optical input 42 and converted into the fifth signal 5, wherein at least one characteristic change is impressed on the fifth signal 5, wherein the characteristic change can include the phase relationship with reference to the fourth signal, frequency, amplitude and output point in time with reference to the fourth signal.

Figure 3:
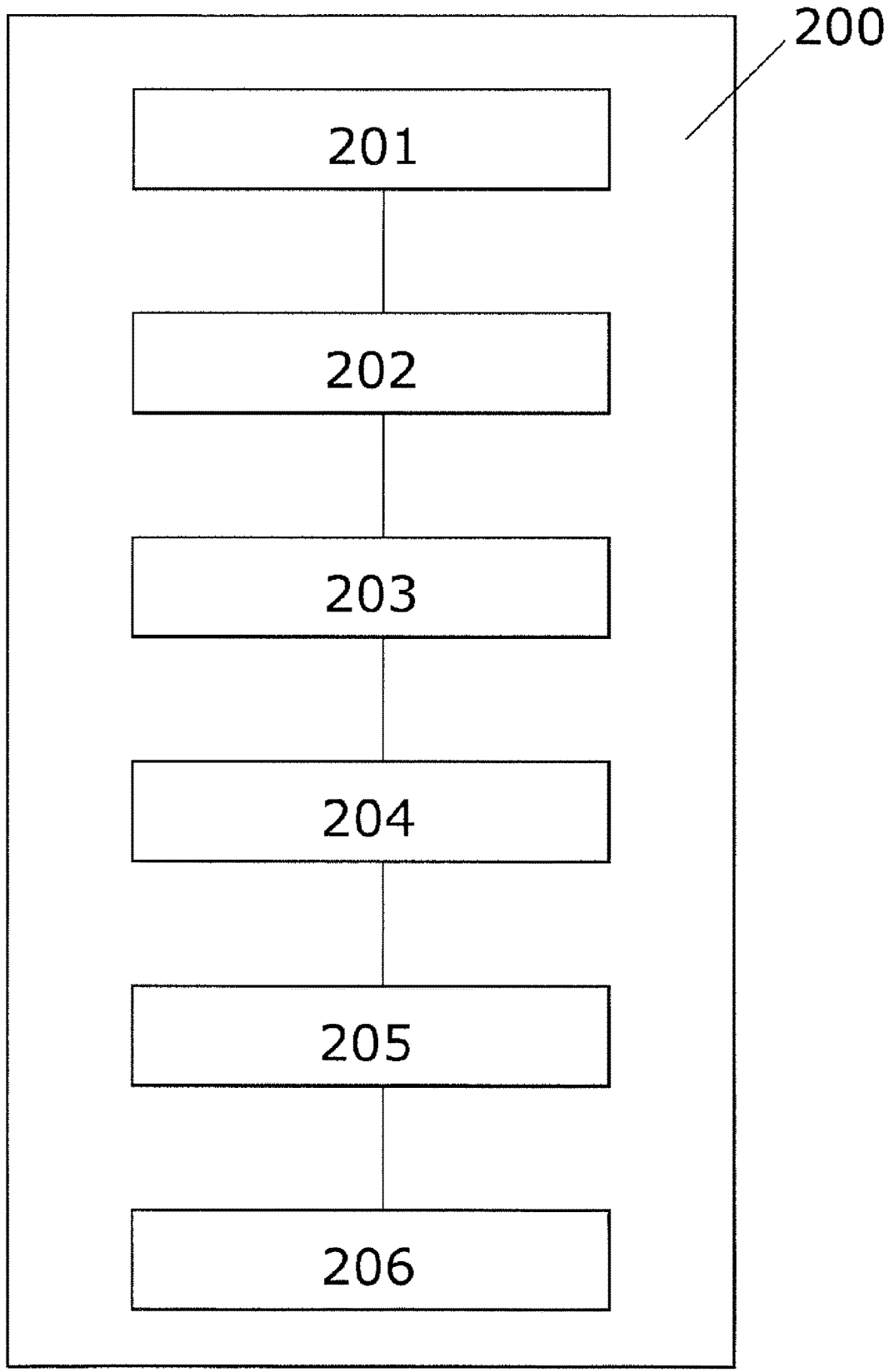
FIG. 3 is by way of example, a flow diagram of a method for operating a measuring device.

FIG. 3 shows a schematic flow diagram of a method 200 of the invention. In a first step 201, the measuring transducer 10 registers a physical or chemical, measured variable and transmits this measured variable to the electronic operating circuit. In a second step 202, the operating circuit 20 selects a first output unit 30 and sends a first signal 1 to the first output unit 30 and sends a first signal 1 to the second output unit 40. In a third step 203, the first output unit receives the first signal and converts it into the fourth signal 4 and into the second signal 2 and outputs the fourth signal 4 to the electrical signal output 33 and the second signal to the optical signal output 34. In a fourth step 204, the second signal 2 is received by the second output unit 40 via the optical input 42 and converted into the fifth signal 5, wherein at least one characteristic change is impressed on the fifth signal 5, wherein the characteristic change can include the phase relationship with reference to the fourth signal, frequency and amplitude. Moreover, the second output unit 40 receives the first signal 1 via the third communication unit 41. In a fifth step 205, the second output unit compares the first signal with the second signal and transmits the result of the comparison to the operating circuit by means of a third signal via the third communication interface 41. The comparison is based, in such case, on signal parameters, such as, for example, amplitude, frequency or phase relationship of the signals relative to one another. In case necessary, in a sixth step 206, the output of a warning signal by the first and/or the second output unit on their electrical signal outputs is triggered by the operating circuit in the case of a minimum deviation of at least one signal parameter of the compared signals.

Figure 4:
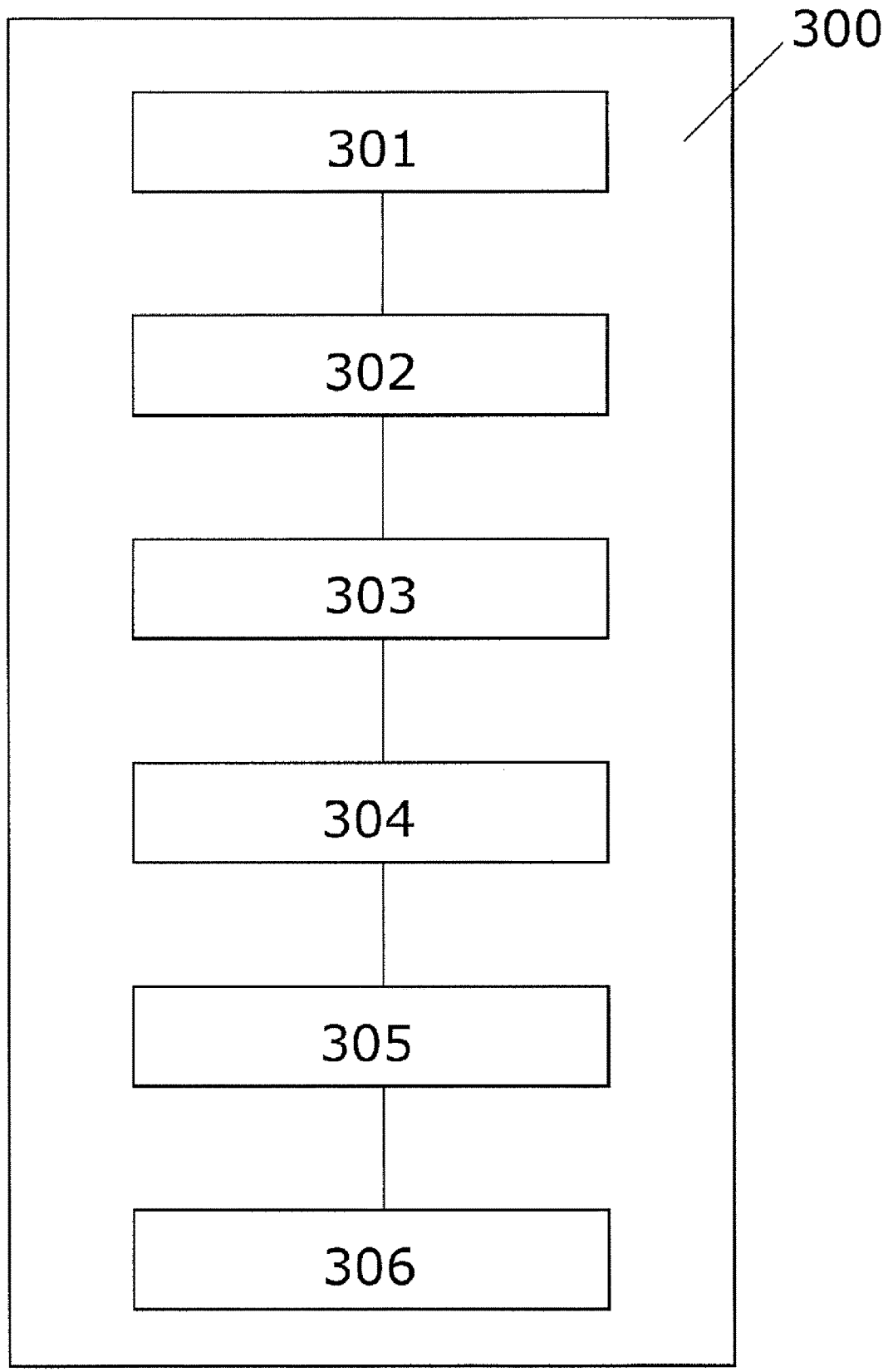
FIG. 4 is by way of example, a flow diagram of a method for operating a measuring device.

FIG. 4 shows a schematic flow diagram of a method 300 of the invention. In a first step 301, the measuring transducer 10 registers a physical or chemical, measured variable and transmits this measured variable to the electronic operating circuit. In a second step 302, the operating circuit 20 selects a first output unit 30 and sends a first signal 1 to the first output unit 30 and sends a first signal 1 to the second output unit 40. In a third step 303, the first output unit receives the first signal and converts it into the fourth signal 4 and into the second signal 2 and outputs the fourth signal 4 on the electrical signal output 33 and the second signal on the optical signal output 34. In a fourth step 304, the second signal 2 is received by the second output unit 40 via the optical input 42 and converted into the fifth signal 5, wherein at least one characteristic change is impressed on the fifth signal 5, wherein the characteristic change can include the phase relationship with reference to the fourth signal, frequency and amplitude. Moreover, the second output unit 40 transmits the first signal 1 via the third communication unit 41 to the operating circuit 20. In a fifth step 305, the operating circuit compares the first signal with the second signal. The comparison is based, in such case, on signal parameters, such as, for example, amplitude, frequency or phase relationship of the signals relative to one another. In case necessary, in a sixth step 306, the output of a warning signal by the first and/or the second output unit on their electrical signal outputs is triggered by the operating circuit in the case of a minimum deviation of at least one signal parameter of the compared signals.

The invention claimed is:

1. A measuring device, comprising:
a measuring transducer for registering a physical or chemical, measured variable and for generating at least one measured value corresponding to the measured variable;
an electronic operating circuit electrically coupled with said measuring transducer and having at least a first communication interface, said operating circuit is adapted to produce, correlating with the measured value, at least a first electrical signal, which is transmitted via said first communication interface; and
at least a first output unit having at least a second communication interface and at least one electrical output and at least one optical output, said first output unit is adapted to receive the first signal via said second communication interface and to convert such into a fourth, electrical signal and into a second, optical signal;
the fourth signal is output via said electrical output and the second signal via said optical output; and
at least a second output unit having at least one optical input and an electrical output wherein:
in that the optical input of said second output unit is coupled to the optical output of said first output unit; and
the second output unit is adapted to receive the second signal via said optical input and to convert such into a fifth, electrical signal;
wherein said second output unit has a third communication interface to the operating circuit,
wherein said operating circuit is adapted to transmit the first signal also to said second output unit;
said second output unit is adapted to compare the first signal sent from said operating circuit with the second signal obtained from said first output unit and, after comparing the signals, to transmit a third signal to said operating circuit via the third communication interface;
said third signal contains information concerning the result of the comparison.

2. The measuring device as claimed in claim 1, wherein:
said first output unit derives the second, optical signal from the fourth signal.

3. The measuring device as claimed in claim 1, wherein:
said operating circuit enables a choice between deriving the second signal from the first signal and the second signal from the fourth signal.

4. The measuring device as claimed in claim 1, wherein:
at least one parameter of the fifth signal has compared with the fourth signal a characteristic change;
said at least one parameter is selected from: phase relationship with reference to the fourth signal, frequency, amplitude, output point in time with reference to the fourth signal, wherein the characteristic change is determinable by the operating circuit.

5. The measuring device as claimed in claim 1, wherein:
said at least two output units are galvanically isolated.

6. The measuring device as claimed in claim 1, wherein:
said first output unit and said second output unit are of equal construction.

7. The measuring device as claimed in claim 1, wherein:
said second output unit is adapted to convert the received second, optical signal into an electrical signal and to transmit such via the third communication interface to said operating circuit; and
said operating circuit performs a comparison of the signal sent to said first output unit with the signal obtained from said second output unit.

8. The measuring device as claimed in claim 1, wherein:
said first and/or said second output unit is adapted in the case of a minimum deviation of at least one signal parameter of the compared signals to produce a warning signal on the associated electrical signal output.

9. A method for operating a measuring device, comprising: a measuring transducer for registering a physical or chemical, measured variable and for generating at least one measured value corresponding to the measured variable; an electronic operating circuit electrically coupled with said measuring transducer and having at least a first communication interface, said operating circuit is adapted to produce, correlating with the measured value, at least a first electrical signal, which is transmitted via said first communication interface; and at least a first output unit having at least a second communication interface and at least one electrical output and at least one optical output, said first output unit is adapted to receive the first signal via said second communication interface and to convert such into a fourth, electrical signal and into a second, optical signal; the fourth signal is output via said electrical output and the second signal via said optical output; and at least a second output unit having at least one optical input and an electrical output wherein: in that the optical input of said second output unit is coupled to the optical output of said first output unit; and the second output unit is adapted to receive the second signal via said optical input and to convert such into a fifth, electrical signal, wherein said second output unit has a third communication interface to the operating circuit, wherein said operating circuit is adapted to transmit the first signal also to said second output unit; said second output unit is adapted to compare the first signal sent from said operating circuit with the second signal obtained from said first output unit and, after comparing the signals, to transmit a third signal to said operating circuit via the third communication interface; said third signal contains information concerning the result of the comparison, wherein the method comprises the steps of:
registering a physical or chemical, measured variable by the measuring transducer and sending the measured variable to the electronic operating circuit;
selecting the first output unit by the operating circuit and sending the first signal to the first output unit;
receiving the first signal by the first output unit and converting the first signal into the fourth signal and second signal and outputting the fourth signal on the electrical signal output and outputting the second signal on the optical signal output;
receiving the second signal by the second output unit; and converting such into the fifth signal and outputting the fifth signal on the electrical signal output.

10. The method for operating a measuring device as claimed in claim 9, wherein:
at least one characteristic change is impressed on the fifth signal.

11. The method for operating a measuring device as claimed in claim 9, wherein:
after selecting the first output unit, the operating circuit chooses between deriving the second signal from the first signal and the second signal from the fourth signal.

12. The method for operating a measuring device, comprising: a measuring transducer for registering a physical or chemical, measured variable and for generating at least one measured value corresponding to the measured variable; an electronic operating circuit electrically coupled with said measuring transducer and having at least a first communication interface, said operating circuit is adapted to produce, correlating with the measured value, at least a first electrical signal, which is transmitted via said first communication interface; and
at least a first output unit having at least a second communication interface and at least one electrical output and at least one optical output, said first output unit is adapted to receive the first signal via said second communication interface and to convert such into a fourth, electrical signal and into a second, optical signal;
the fourth signal is output via said electrical output and the second signal via said optical output; and at least a second output unit having at least one optical input and an electrical output wherein: in that the optical input of said second output unit is coupled to the optical output of said first output unit; and the second output unit is adapted to receive the second signal via said optical input and to convert such into a fifth, electrical signal, wherein said second output unit has a third communication interface to the operating circuit, wherein said operating circuit is adapted to transmit the first signal also to said second output unit; said second output unit is adapted to compare the first signal sent from said operating circuit with the second signal obtained from said first output unit and, after comparing the signals, to transmit a third signal to said operating circuit via the third communication interface; said third signal contains information concerning the result of the comparison,
wherein the method comprises the following steps:
registering a physical or chemical, measured variable by the measuring transducer and sending the measured variable to the electronic operating circuit;
selecting the first output unit by the operating circuit and sending the first signal to the first output unit and sending the first signal to the second output unit;
receiving the first signal by the first output unit and converting the first signal into the fourth signal and the second signal and outputting the fourth signal on the electrical signal output and outputting the second signal on the optical signal output;
receiving the first signal and the second signal by the second output unit and converting the second signal into the fifth signal and outputting the fifth signal on the electrical signal output; and
comparing the first signal with the second signal by the second output unit and sending the result of the comparison to the operating circuit by means of a third signal triggering the output of a warning signal by the first and/or the second output unit on their electrical signal outputs by the operating circuit in the case of a minimum deviation of at least one signal parameter of the compared signals.

13. The method for operating a measuring device especially as claimed in claim 12, further comprising the steps as follows:
registering a physical or chemical, measured variable by the measuring transducer and sending the measured variable to the electronic operating circuit;
selecting the first output unit by the operating circuit and sending the first signal to the first output unit and sending the first signal to the second output unit;
receiving the first signal by the first output unit and converting the first signal into the fourth signal and second signal and outputting the fourth signal on the electrical signal output and outputting the second signal on the optical signal output; and
receiving the second signal by the second output unit and converting such into the fifth signal and outputting the fifth signal on the electrical signal output and converting the second signal into an electrical signal and sending the electrical signal to the operating circuit;
comparing by the operating circuit of the first signal on the first output unit with the second signal received from the second output unit triggering the output of a warning signal by the first and/or the second output unit on their electrical signal outputs by the operating circuit in the case of a minimum deviation of at least one signal parameter of the compared signals.

* * * * *